UNITED STATES PATENT OFFICE.

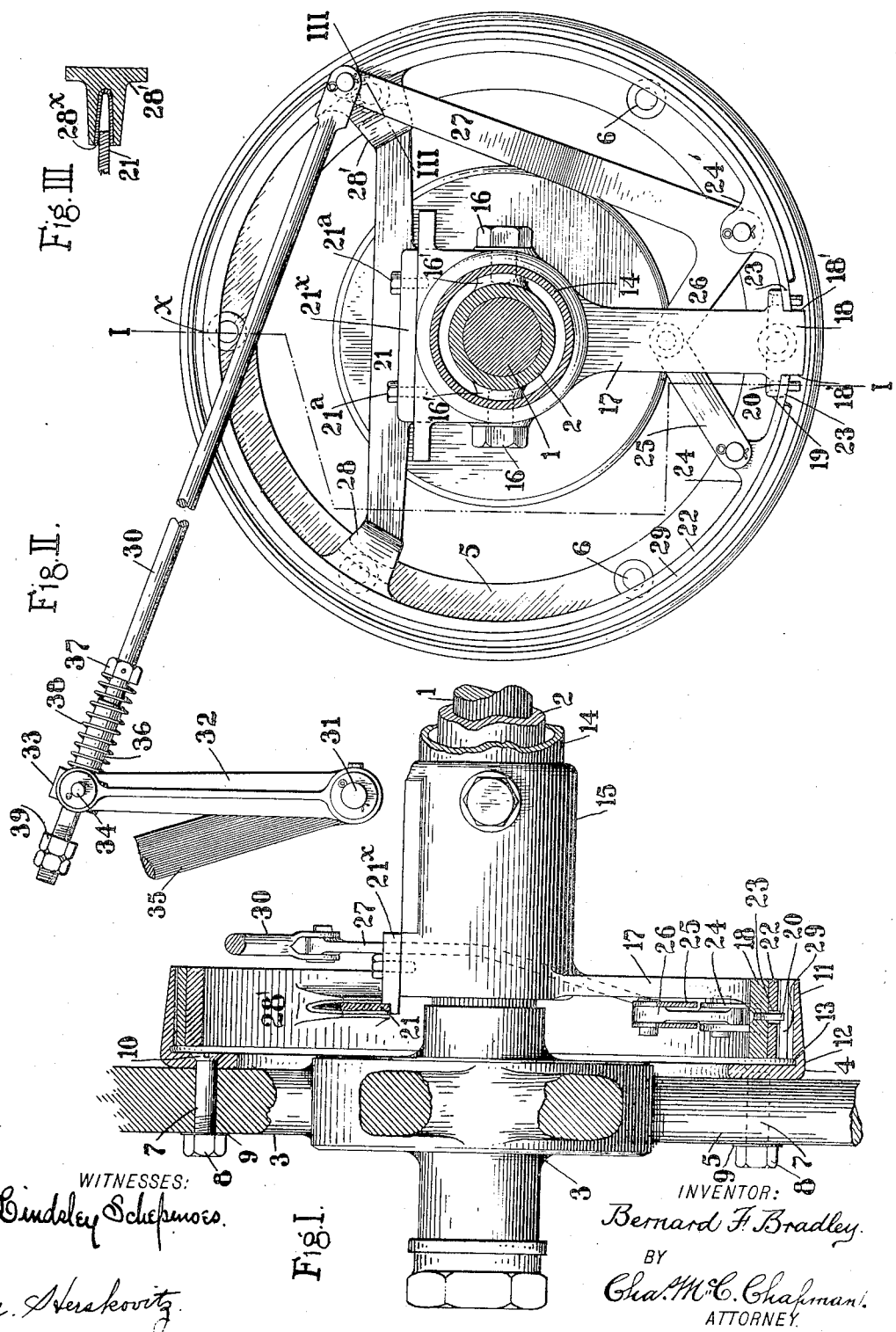

BERNARD FRANKLIN BRADLEY, OF NEW YORK, N. Y.

BRAKE FOR VEHICLES.

No. 836,085.　　　Specification of Letters Patent.　　　Patented Nov. 20, 1906.

Application filed September 21, 1903. Serial No. 174,003.

*To all whom it may concern:*

Be it known that I, BERNARD FRANKLIN BRADLEY, a subject of the King of Great Britain, residing in the city of New York, county and State of New York, have invented a new and useful Improvement in Brakes for Vehicles, of which the following is a description.

This invention relates to brakes for vehicles of all kinds, and particularly to the class of brakes falling under the general description of "friction-brakes" and which expand radially.

It is an object of this invention to provide a brake for vehicles of all kinds which will be positive and certain in its action and by which a maximum amount of medium of friction can be applied with a minimum amount of actuating force and movement.

Another object of this invention is to provide a brake mechanism which is compact and simple in structure and which has few parts so arranged and disposed as to be accessible for purposes of inspection and for the correction of any wear which may occur during operation.

Another object of this invention is to provide a brake mechanism the parts of which will automatically compensate for wear on its braking-surfaces Another object of this invention is to produce a brake mechanism in which the expanding member automatically returns to a concentric position when released and is there maintained when not in operation, thus avoiding the noise and rattling of parts such as is common to existing forms now on the market.

Another object of this invention is to provide a brake mechanism which will be equally effective in both directions of movement of the vehicle.

Another object of this invention is to provide a brake mechanism which can be applied to any vehicle without the necessity for altering any of the parts of either the brake or vehicle and which is easy of application and removal.

A further object of this invention is to provide a brake mechanism of few and simple parts, the coöperation of which enables powerful pressure to be applied instantly and with a high degree of certainty.

Other objects will appear during the course of this description, and with the same in view, together with those above specifically pointed out, this invention consists in the parts, features, elements, and combinations hereinafter described and claimed.

In the drawings which form part of this specification, Figure 1 is an elevation of a portion of a vehicle-wheel and its axle, showing the application of the brake mechanism thereto, portions of the latter being in section and the section being on line 1 1 of Fig. 2. Fig. 2 is a side elevation of the brake mechanism, the axle of the vehicle, its bearing and the housing therefor being shown in section; and Fig. 3 is a section taken on the line 111 111 of Fig. 2, showing the means by which lateral displacement and rattling of the brake member are prevented.

Primarily it is to be understood that in this description I have disclosed what I deem to be at the present time the best embodiment of my invention; but I wish it distinctly understood that within the scope and principle of the broad idea of means involved there may be many modifications made in details which are within the skill of any mechanic and which may be necessitated by the application of my brake mechanism to vehicles of different kinds or styles.

I have indicated the axle of the vehicle by 1, the bearing for such axle by 2, and the wheel by 3, the spokes and hub only of which are shown. Further details of these parts have not been illustrated nor described, because the same are not of importance to my invention and are not deemed to be necessary to an exposition of the latter.

My brake mechanism consists, essentially, of the brake-wheel 4, having the flange 5, bored at intervals at 6 for the insertion of the screw-bolts 7, which pass through the spokes of the wheel or any other suitable portion thereof and are held and clamped in place by means of nuts 8, which bind against suitable washers 9. The apertures 6 are flared from the outside of the flange 5 purposely for the reception of the correspondingly-flared heads 10 of the screw-bolts 7, this structure of parts enabling the heads of the screw-bolts to be sunk below the surface of the flange 5 and be completely housed by the latter, so as to produce a nice finish and avoid any possibility of the heads of the bolts interfering with the parts of the brake mechanism.

The brake-wheel 4 is also provided with a rim 11, the inner surface of which is uniform, but the outer surface of which is beveled so as to provide a thicker portion at the angle 12, this structure giving strength and stability to the casting. At the angle on the inside the casting is provided with the groove 13, the object of which is to prevent the formation of shoulders or flanges, which might be detrimental to the life or action of the brake member produced by wear between the brake member and the rim 11.

14 indicates a housing which surrounds the axle and its bearing and extends from hub to hub of the wheels of the vehicle. Attached to said housing 14 and surrounding the same is a casting consisting of the tubular portion 15, which is brazed or otherwise fixed to said housing, thus rendering the one immovable relatively to the other. Moreover, to prevent longitudinal movement of the housing 14 and tubular casting 15 relatively to the axle-bearing 2 and also to aid in supporting said casting 15 in proper position, as shown in the drawings, two or more bolts 16 are tapped through the tubular portion, through the housing 14, and into the bosses 16' of the bearing 2, such bosses being slightly rounded, as shown, for the purpose of permitting flexure of the axle 1 relatively to the casting 15. The tubular portion 15 of the casting has the depending or extended portion 17, which terminates below the flange 5 in the enlarged portion 18, extending laterally substantially the width of the rim 11 and having the lugs 19, through which are extended the screw-threaded smooth-ended stop-pins 20 for a purpose to be hereinafter described. The tubular casting 15 is also provided with the cross-bar 21, the opposite ends of which perform a function hereinafter set forth. It will be seen that this casting, fixed as above described, has its portion 17 extended to within a short distance of the inner surface of the rim 11.

The brake member is designated by 22 and consists of a highly-resilient spring-metal band, said member being in the form of a split ring, the ends of which normally rest against the shoulders 18' of the enlarged portion 18, and said ends of the brake member 22 being slotted or bifurcated at 23, so as to freely embrace the pins 20, which extend from the lugs 19 to within a short distance of the inner periphery of the rim 11. This structure prevents any lateral displacement of the free ends of the brake member and compels them to always be in position for operation. The lugs 19 also have the function of limiting the contraction of the brake member and of preventing the free ends thereof from being displaced. The shoulders 18' also have the function of limiting the contraction of the brake member and providing a means by which the action of said member can always be relied upon because said shoulders form abutments for the primary and final action of said member. The brake member may be made substantially uniform in thickness throughout its length and secure good results; but I have found in practice that by rendering said member eccentric or of gradually-increasing thickness from its ends to the point $x$ the member becomes more effective, friction is applied uniformly, and the power, holding capacity, and durability of the member are greatly increased. This is an important feature of my invention.

The brake member 22 near its ends is provided with ears 24 and 24', the ear 24 having pivotally connected thereto a link 25, to the outer end of which is pivotally connected the short arm 26 of a bell-crank lever, which is pivoted at its angle to the ear 24' and the long arm 27 of which is extended in substantially the manner and to approximately the position shown in Fig. 2. From this structure it will be seen that by reason of the length of the arm 27 of the bell-crank a very slight movement of the latter will throw the brake member into action and cause the latter to quickly expand against the rim 11 of the brake-wheel. The brake member 22 is also provided with the bifurcated lugs 28 and 28', the slot in which is caused to slightly converge from the ends thereof and the walls of which are faced with leather 28$^\times$ or other non-resonant material. Coöperating with these lugs 28 and 28' are respectively the ends of the cross-bar 21, which ends substantially conform to the shape of the said slots, and as the lugs are not, after the parts are adjusted, actually free from or beyond the reach of the ends of the cross-bar the brake member is prevented from having any lateral movement which would tend to free the same from proper position for effective engagement with the rim of the brake-wheel. By causing the slots in the lugs to converge a snug fit is obtained between the same and the ends of the cross-bar 21 when the brake member is not expanded into action, and by facing the walls of the slots in lugs 28 and 28' as described means are provided for preventing rattling or any looseness or play between the parts.

From this description of the brake member 22 it will be seen that the same is entirely free from and independent of the axle 1, the brake-rim 11, and all of the coöperating parts of the brake mechanism, thus being, in effect, what may be termed a "floating" brake member, for the elasticity of the brake-band is of such character as to cause its ends to have a normal tendency to contract and coil within its circumference, thus enabling said ends to tightly engage the respective lugs 19 and shoulders 18' of the abutment or enlarged portion 18. This normal tendency of the ends of the band 22 to contract results in firmly holding the band when its ends are engaged with the lugs 19 and shoulders 18' in the position shown in Fig. 2 with an inherent power and readiness to do work—that is to say, when the brake-band has been expanded and sprung into position, as in Fig. 2, its inherent contractile force and strength enables it to so remain until sufficient power is applied to force it into contact with the rim of the brake-wheel, and such inherent or contractile strength is also sufficient to prevent its ends rattling on adjacent parts and to enable said band to maintain and support the weight of its actuating mechanism, which in turn, through the medium of its expansion-spring 38, prevents looseness and rattling of parts. Thus by the mere agency of its inherent elasticity the brake-band 22 is maintained in the position of Fig. 2, inoperative, but ready to do work, without the aid of positive external support. However, during the operation and travel of the vehicle over rough roads violent vibration and jarring of parts may occur which would probably, while the brake-band is inoperative, tend to cause its gradual settling or movement until its ends were caused to drag upon the rim of the brake-wheel or until its body portion were moved laterally either into contact with the back of the brake-wheel or sufficiently beyond the outer edge of the rim of the latter to be entirely displaced or become ineffective for braking purposes. To overcome these possible tendencies and objectionable occurrences, I have provided the pins 20, which coöperate with the ends of the brake-band, and the lugs 28 and 28', which coöperate with the ends of the cross-bar 21, both of which prevent any lateral movement of the brake-band relatively to the brake-wheel, while by converging the slots in the lugs 28 and 28' so as to enable the crotch of the latter to engage the ends of the cross-bar, should there be occasion, excessive and objectionable movements of the brake-band as a whole or at its ends toward the rim of the brake-wheel are prevented while the brake-band is out of operation and when it is not desired to apply the brake. Therefore while I have provided a means by which the brake-band may be supported should the occasion or contingency arise, it will be clear that under normal conditions said band is without positive external support, being in consequence virtually a floating brake member. Furthermore, it will be seen from the description that the actuating mechanism is also independent of the axle and of the coöperating parts of the brake mechanism. These several elements of construction and their accompanying functions are distinctive of my brake mechanism and are important features of my invention in that they produce a simple, powerful, and effective brake for all kinds of heavy and light vehicles, and one which is easily assembled or taken apart, easily and quickly operated, which will stand great wear and tear, and which requires but a minimum of force and movement to obtain a maximum power and effective action.

To the periphery of the brake member 22 is applied any suitable frictional material 29, that found most durable and effective being what is known in the art as "gandy-belt." This gandy-belt is applied to the periphery of the brake member 22 so that its ends reach to approximately the inner end of the slots 23 in the ends of the brake member, thus preventing the pins 20 from objectionably engaging said belt.

In order to operate my brake mechanism thus described, I connect to the upper end of the long arm 27 of the bell-crank lever an actuating-rod 30, which is extended beyond the periphery of the brake-wheel and to a point convenient for attachment to any usual hand-operated lever. Merely for the purpose of illustrating this connection I have shown in the drawings a rock-shaft 31, which is suitably journaled to the vehicle-body and has suitably connected to one end a short arm 32, to which the rod 30 is connected, by sliding through the head 33 of a swivel-pin 34, suitably held in the upper end of the arm 32. The other end of the rock-shaft 31 is provided with the hand-lever 35. The swivel-head 33 is also provided with the sleeve 36, which surrounds the rod 30, and suitably fixed upon said rod a short distance from the end of the sleeve 36 is the nut 37 or other suitable stop. Surrounding the sleeve 36 is the coiled spring 38, one end of which engages the stop 37 and the other end of which engages the head 33. On the end of the rod beyond the head 33 are applied one or more nuts or other suitable adjustable stops 39, the same being screwed to the end of the rod, as shown. As will be seen, there is a clearance between the end of the sleeve 36 and the stop 37, and the spring 38 is made quite strong, so as to normally hold the stop and sleeve separated, thus preventing movement between the parts, which would cause rattling, but at the same time permit play between the rod 30 and lever-arm 32 for the functions hereinafter noted. Said spring 38 also has the function of preventing the operator from exerting an undue force through the rod 30 when putting the brake out of action and which, moreover, would have a tendency to injure the parts of the mechanism. Hence it will be seen that by applying the spring in the manner indicated all jarring is absorbed and looseness and rattling prevented. Another important function is subserved by the structure just described, for it must be borne in mind that the vehicle-body to which the operating-lever is pivoted has considerable "spring" or movement relatively to the wheels and axles, which may be manifested when weight is added to the said body or the vehicle is traveling over rough roads. When such movement occurs, the loose and yielding connection between the arm 32 and rod 30 permits the two to have considerable play and yield, thus preventing the spring of the vehicle from affecting the rod or brake mechanism, and the spring 38 takes up and absorbs the movement, prevents rattling, looseness, strain, or jamming of the parts and maintains the parts in their proper relation undisturbed.

From the above description the operation of the brake mechanism will be clear; but it may be added that as movement is imparted to the bell-crank lever the short arm thereof, through the medium of the connecting-link 25 and the reaction of the latter, which becomes a fulcrum for the lever, instantly and powerfully applies the brake member to the rim of the brake-wheel, and it will be seen that the contact of the brake member with the brake-wheel is equal in every part and the force and friction are equally distributed throughout the extent of the contact-surfaces. It will also be seen that very little power and very little movement are necessary to set the brake mechanism in action and that when once started into action the action is cumulative, and consequently little power is needed to hold the same to its work. Moreover, to separate the friction members no power is required, the elastic force of the spring 38 and of the brake member 22 being, in fact, sufficient for the purpose.

At this point it is desired to lay stress upon some of the important features of my invention, principally among which may be noted that when the brake member 22 is moved into action every portion of its surface is instantly applied to the rim of the brake-wheel, said member 22 fitting tightly and snugly against said rim and applying in consequence a powerful frictional pressure. The brake member 22 is expanded into action in contradistinction to being contracted into action, and this feature of the brake enables the friction-surfaces to be housed or covered, thus preventing the collection of grit or dirt and the consequent wear of the parts. The disposition of the parts is such as to render access easy and convenient for purposes of adjustment and repair, and the few simple parts are so combined as to render it impossible for faults or disorder to occur during use, and the disposition of the means for preventing rattling of the parts and for giving the initial movement to the brake member 22 adjacent the operating-lever 35 and away from the brake mechanism enables ready access to these important parts for adjustment, &c.

It is also desired to lay stress upon some important functions of my brake mechanism, among which may be noted that from constant use the gandy-belt may wear away and also the brake member 22 and to such extent that the thinnest rim may be left without destroying its expansive quality, and thus the member 22 will perform its work effectively, and whatever wear takes place occurs equally throughout the entire friction-surfaces, the member 22 thus automatically compensating for wear on the braking-surfaces. Again, when the brake member 22 has been released from its work it instantly and automatically returns to a concentric inoperative position with its ends closely and forcibly hugging or bearing against the shoulders 18′ and the lugs 19, where said ends are maintained snugly and tightly both by the elasticity of the member 22 and the expansive force of spring 38, which operates upon the nut 37 on rod 30 and holds the lever 26 27 and link 25 firmly in the inoperative position shown in Fig. 2, the rock-shaft 31 being presumed to be locked in its inoperative position and the spring 38 to be under compression. Furthermore, it will be clear that the brake mechanism is equally effective whether the vehicle be moving forward or backward, for when the member 22 is applied the friction is applied equally and with equal force all round and the direction of rotation of the wheels is immaterial, the shoulders 18′ providing limiting-abutments to prevent circular movement of member 22.

It will now be quite clear that I have produced a form of brake mechanism which is applicable to any and every kind of vehicle, and one which is easily operated, is powerful in its action, is simple in structure, and durable. It may be stated that in operation this brake has been found to apply its force instantly and effectively and that its application can be made with such rapidity and force as to cause the wheels to skid.

Having thus described my invention, what I claim, and desire to secure by Letters Patent, is—

1. A brake mechanism comprising two friction members, one of which is a split ring and is made of spring metal and has inherent properties whereby its ends have a constant tendency to coil within its circumference and thus automatically free itself from the other member, and said member being independent of, and having no rigid connection with, the other parts of the brake mechanism; means coöperating with the ends of said spring member to limit its coiling tendency and for holding the ends of said spring member separated; and means for driving said spring member bodily into contact with the other member.

2. A brake mechanism comprising two friction members, one of which is made of normally contractile spring metal, is eccentric to and automatically frees itself from the other to assume a normal position out of contact with the latter, and said member being independent of, and having no rigid connection with, the other parts of the brake mechanism, means coöperating with the ends of said member to limit its contraction, and means for driving said eccentric member bodily into contact with the other member.

3. A brake mechanism comprising two friction members, one of which is a split ring made of spring metal and has inherent properties whereby its ends have a constant tendency to coil within its circumference and thus automatically free itself from the other member; stationary means for engaging the ends of said spring member for supporting the latter free from connection with any stationary part of the vehicle-body and for positively positioning and maintaining the members relatively inoperative; and means for driving the spring member bodily into contact with the other member in opposition to its coiling tendency.

4. A brake mechanism comprising two friction members, one of which is a split ring made of spring metal and has inherent properties whereby its ends have a constant tendency to coil within its circumference and thus automatically free itself from the other member; stationary means for engaging the ends of said spring member for supporting the latter free from connection with any stationary part of the vehicle-body; means for preventing displacement of said spring member relatively to the other; and means for driving said spring member bodily into contact with the other member in opposition to its coiling tendency.

5. A brake mechanism comprising a brake-wheel and a split brake-ring; mechanism for actuating said ring bodily into contact with said wheel, a portion of such actuating mechanism being located within and a portion outside the scope of said brake members; and said latter portion having a cushion device coöperating therewith to prevent rattling of the parts and to normally tend to hold the latter in an inoperative position.

6. A brake mechanism comprising a brake-wheel and a split, resilient brake-ring; stationary means interposed between the ends of said ring for holding the latter in a normal position; mechanism for actuating said ring bodily into contact with said wheel; a manually-operated means for actuating said mechanism; and a yielding device located beyond the circumference of the said brake members and adjacent said means and coöperating with the latter for preventing the elements of said mechanism from rattling when the latter are in an inoperative position and the ends of said ring are engaged with said stationary means.

7. A brake mechanism comprising a brake-wheel; a split, floating, eccentric ring; and means for bodily moving the ring into contact with the wheel for creating friction between the said ring and wheel, said means including a cushion device operating to prevent rattling of the parts of the brake mechanism.

8. A brake mechanism comprising a brake-wheel; a contractile split ring so constructed as to cause its ends to have a constant tendency to coil within its circumference; a stationary abutment extending between the ends of said ring for holding said ends separated and in an inoperative position; and means for expanding said ring and forcing it bodily into engagement with said wheel.

9. A brake mechanism comprising a brake-wheel; a brake member consisting of a split ring normally out of contact with the brake-wheel; an abutment located between the ends of the ring and having means coöperating with the latter for preventing lateral movement of said ring relatively to the wheel; and means independent of the last-named means for forcing said ring bodily into engagement with said wheel.

10. A brake mechanism comprising a brake-wheel; a contractile split ring having inherent properties whereby its ends have a constant tendency to coil within its circumference; stationary means coöperating with the ends of said ring for limiting the coiling tendency of the latter and for holding said ends separated; and means for forcing said ring bodily into engagement with said wheel.

11. A brake mechanism comprising a brake-wheel; a split brake member having inherent properties whereby its ends have a constant tendency to coil within its circumference; stationary means coöperating with the ends of said member for limiting its coiling tendency and for maintaining said member in an inoperative position out of contact with the brake-wheel; and means for forcing said member bodily into engagement with said wheel, the said member and both the said means being within the circumference of said wheel.

12. A brake mechanism comprising a brake-wheel; a contractile, split, brake-ring contained in said wheel having inherent properties whereby its ends have a constant tendency to coil within itself; stationary means interposed between the ends of said ring for limiting the contraction thereof; and means for bodily actuating the ring for creating friction between the said wheel and ring.

13. A brake mechanism comprising a brake-wheel; a split brake-ring, contained in brake-wheel, having inherent properties whereby its ends have a constant tendency to coil within itself and thus be held by inherent contractile force out of contact with said wheel; stationary means interposed between the ends of said ring and for preventing the ring from coiling or collapsing within the wheel; and means for bodily actuating the ring for creating friction between the said wheel and ring.

14. A brake mechanism comprising a brake-wheel; a brake member consisting of a single, contractile, spring-band having inherent properties whereby its ends have a constant tendency to coil within its circumference; stationary means for limiting the coiling tendency of said member; and means for driving said member bodily against said wheel, said means being supported by said member.

15. A brake mechanism comprising a brake-wheel substantially right-angular in cross-section, and having a groove at the inside of the angle; a split ring coöperating with the wheel adjacent the groove; and means for creating friction between the wheel and ring, whereby wear of the ring on the wheel will not create shoulders or ribs to the detriment of the ring and the braking action.

16. A brake mechanism comprising a brake-wheel; an abutment; a brake member having inherent properties whereby it may support itself in engagement with said abutment; and means for driving the said member bodily against the said wheel, said means being supported entirely by said member.

In testimony whereof I have hereunto signed my name in the presence of two subscribing witnesses.

BERNARD FRANKLIN BRADLEY.

Witnesses:
CHAS. McCHAPMAN,
M. HERSKOVITZ.